United States Patent Office 2,783,845
Patented Mar. 5, 1957

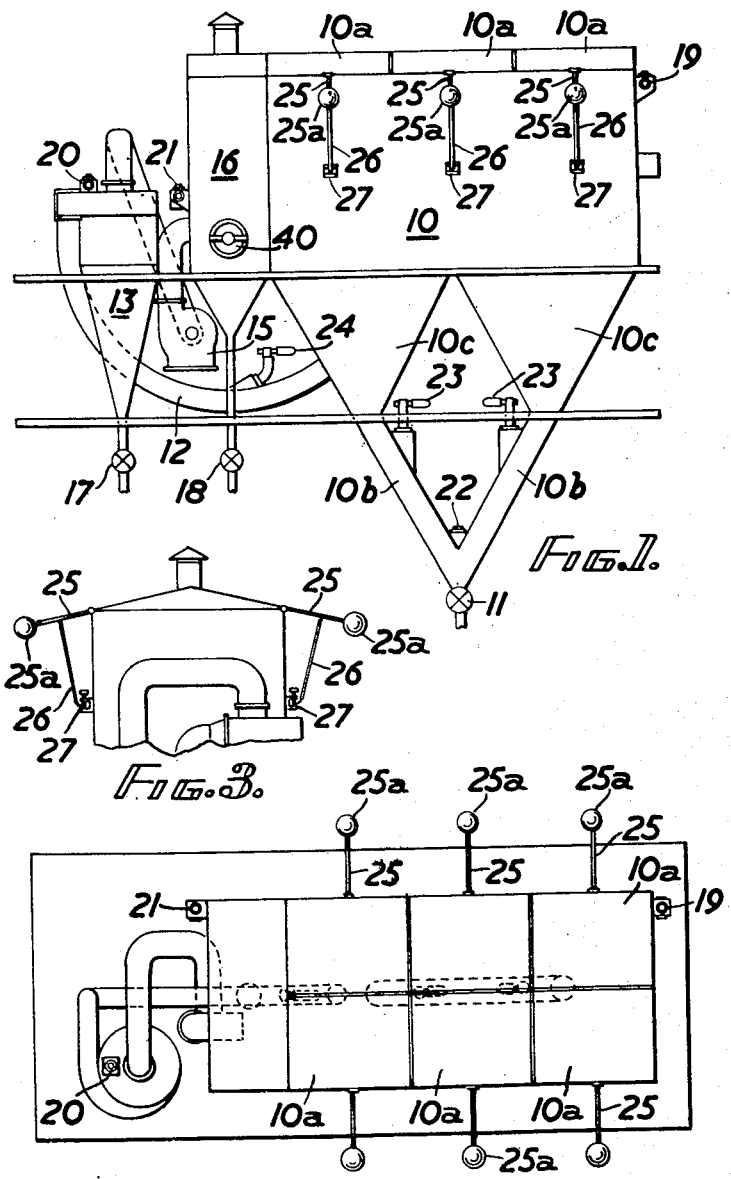

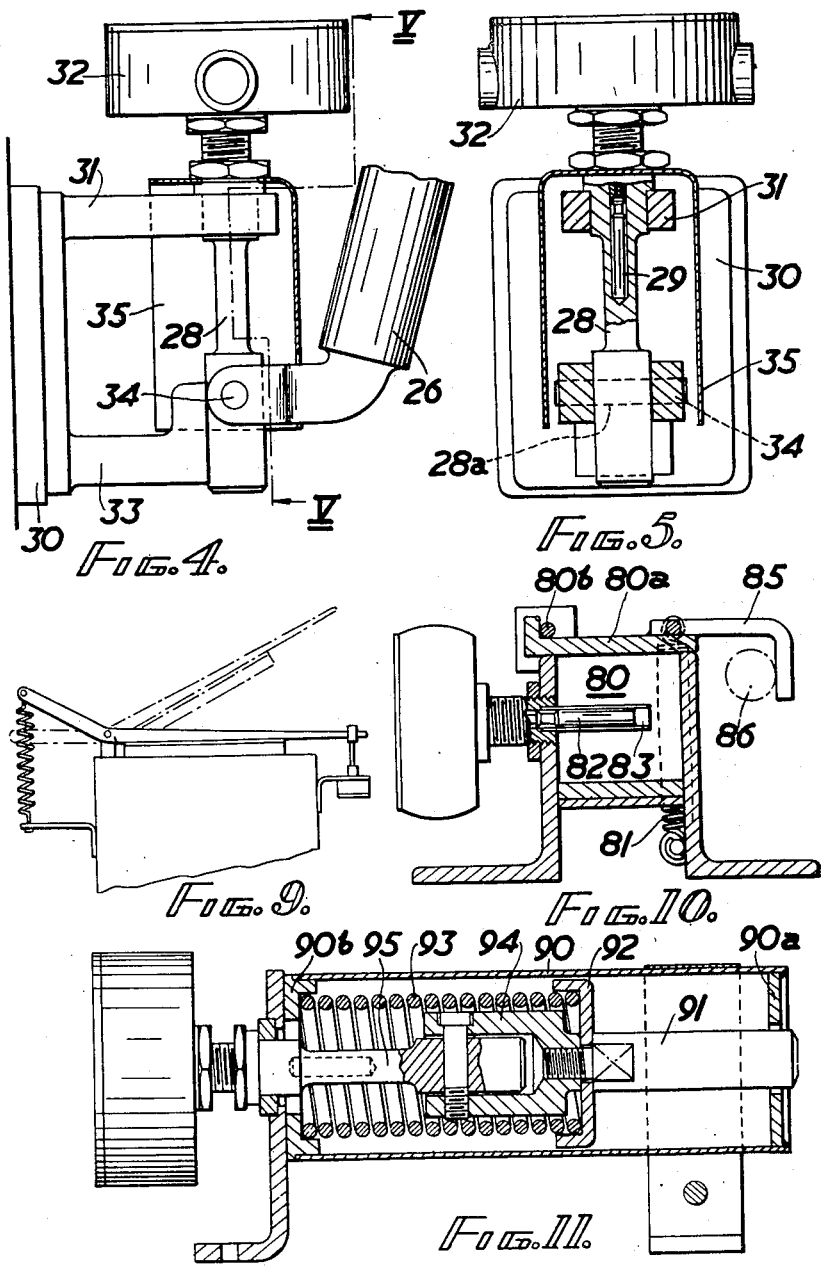

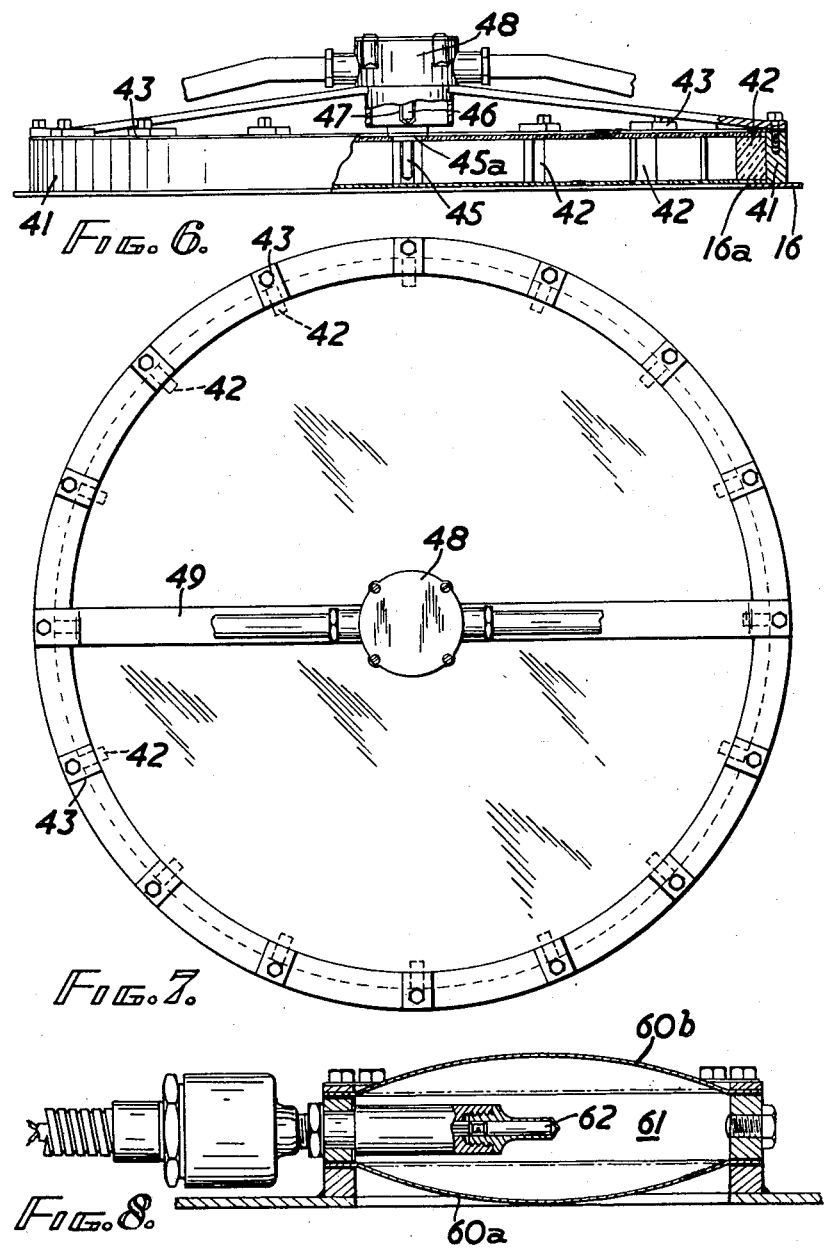

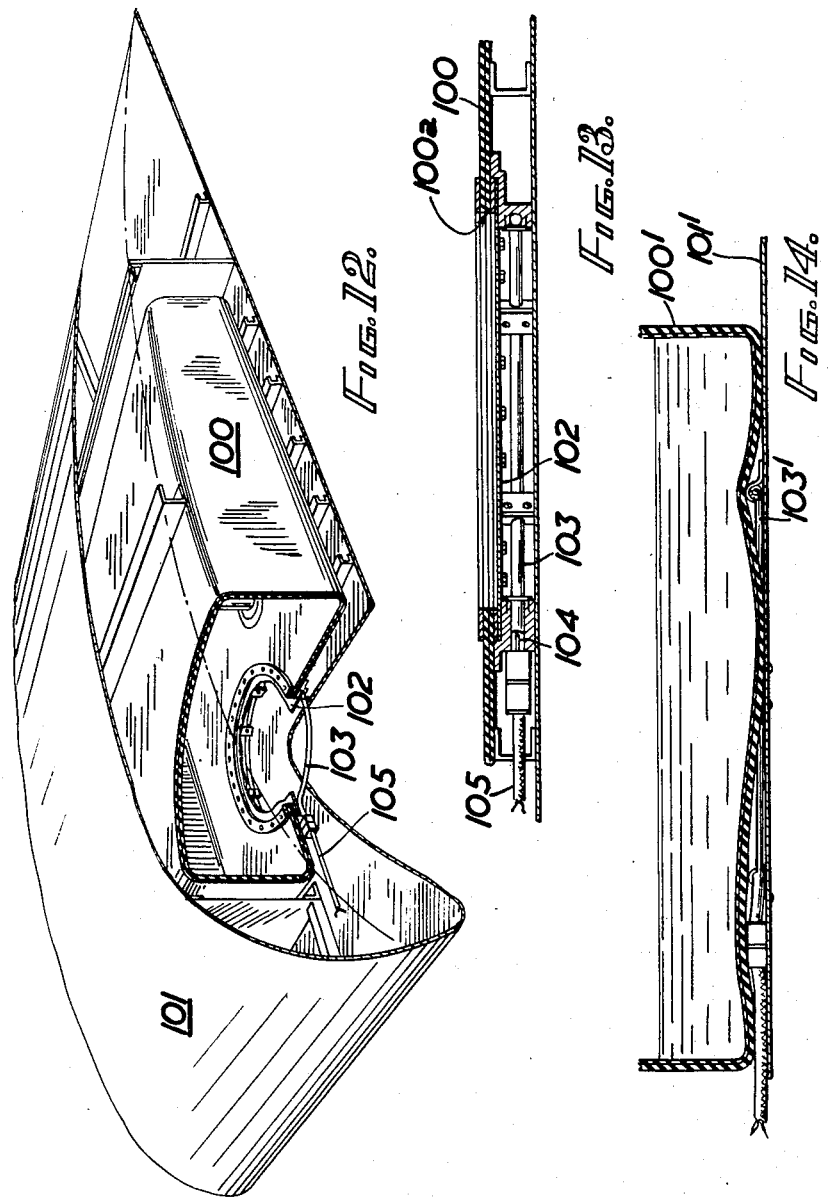

2,783,845

MEANS FOR AFFORDING RAPID RELIEF OF PRESSURE

Anders Mathisen, London, England, assignor of one-half to Graviner Manufacturing Company Limited, London, England, a British company, and one-half to The Wilkinson Sword Company Limited, London, England, a British company Application May 12, 1954, Serial No. 429,360

Claims priority, application Great Britain May 13, 1953

17 Claims. (Cl. 169—1)

This invention relates to means for affording rapid relief of pressure.

The means to be described hereinafter find use in the protection of plant or equipment from the effects of an excessive rise in pressure in an enclosed zone therein, by venting the zone before a predetermined pressure is attained and thereby preventing the pressure rising to a value at which the plant or equipment would be damaged or destroyed. Thus, such means are particularly applicable to reducing or preventing damage due to explosions.

According to the present invention there is provided means for affording a rapid relief of excess pressure in an enclosed zone, which comprises means for detecting the onset of an elevated pressure in said zone, and thereupon opening by means of an explosive charge a normally closed venting aperture whereby the excess pressure is rapidly relieved.

The invention is particularly applicable to the protection of plant where finely divided explosive dusts and powders are handled, such as grinding and pulverising plants, cyclones and other filters, and electrostatic precipitators, explosions occurring in such plants, for example, as a result of ignition from sparks due to tramp iron, flint, etc. The invention also finds application in the protection of plant in which catalytic chemical processes are performed, and in the protection of diesel engine crankcases and tanks containing hydrocarbon fuels.

The term "enclosed zone" used above is not limited to zones which are completely enclosed, but includes zones from which pipes or ducts lead or which have apertures in the walls thereof, provided that the venting area provided by such pipes, ducts or apertures is not sufficient to prevent an undesirable rise of pressure in the zone as the result of an explosion or other fortuitous rise in pressure.

Several embodiments of the invention will now be described, by way of example only, in connection with their application to the protection of an industrial plant designed to handle finely divided powders which are potentially explosive. The application of the invention to the protection of aircraft fuel tanks will also be described.

The various embodiments will be described with reference to the accompanying drawings, in which:

Fig. 1 is a somewhat diagrammatic side elevation of the industrial plant.

Fig. 2 is a plan view of the plant, whilst

Fig. 3 is a fragmentary side elevation of the top portion of the plant;

Fig. 4 is a side elevation, on an enlarged scale, of the explosive catch shown in Fig. 1, and Fig. 5 is a part sectional view along the line V—V in Fig. 4;

Fig. 6 is a part sectional plan view of a glass bursting disc used in the protection of the plant, and Fig. 7 is a sectional side elevation of the disc shown in Figure 6.

Fig. 8 is a sectional side elevation through an alternative form of bursting disc;

Fig. 9 shows an alternative method of effecting lifting of the roof of a plant, whilst Fig. 10 shows a sectional side elevation of an alternative form of explosively released catch;

Fig. 11 shows a sectional side elevation through an explosively operated actuator, and Fig. 12 is a perspective view showing the application of the invention to an aircraft fuel tank, whilst Figs. 13 and 14 show detailed views of alternative methods of fitting the explosive charge.

The plant shown in Figs. 1 to 3 is typical in respect of its explosive risks of many industrial plants handling finely divided powders and dusts, as referred to above. In the plant illustrated, powder is produced in the main vessel 10 from which powder-laden air is withdrawn into filter compartments 13 and 16 in which the powder is extracted from the air.

As shown in Figs. 1 to 3 this particular plant comprises the main vessel 10 which is substantially closed, the lower end of the vessel being formed into two discharge hoppers 10a, 10a for deposited powder, which hoppers terminate in relatively narrow pipes 10b, 10b, whose ends join at a common discharge control valve 11. The vessel 10 is also connected by a pipe 12 entering in the side of the vessel to the input of a cyclone filter 13 the output of which is connected by a pipe 14 via a fan 15 to a bag filter 16. Powder-laden air from the vessel 10 is drawn through the filters 13 and 16 which both terminate at their lower end in hoppers in which the powder is deposited and is drawn off through discharge control valves 17 and 18 respectively. The process performed in this plant is such that whilst there is a danger of an explosion occurring in the main vessel or the filters or possibly even in the connecting pipes, it is most likely to occur in the main vessel 10 or in the two pipes 10b leading from the discharge hoppers 10a.

Whilst it would be possible to provide fire and/or explosion detection means in each vessel, and also perhaps in the pipes, and also to provide a sufficient number of suppressant discharging devices in each space to suppress completely any explosion occurring therein when these latter means are operated by the detection means in the associated space, such an arrangement may well be uneconomical or undesirable for other reasons. Thus, we have found that in certain installations, such as the one under discussion, it may be sufficient simply to relieve the explosion in the vessel in which it occurs without suppressing it, provided that action is taken to prevent the explosion spreading along connecting pipes to the other vessels.

In this embodiment of the invention, therefore, explosion detection means 19, 20 and 21 are provided in each of the three vessels 10, 13 and 16 respectively. A fourth detection means 22 is also provided at the junction of the pipes 10b leading from the discharge hoppers 10a owing to the likelihood of explosions starting in these pipes.

The detection means may comprise means for detecting a rapid rise of pressure such as are described in British patent specification No. 643,188 or the specification accompanying United States Patent application Serial No. 282,243, now Patent No. 2,701,827 dated February 8, 1955, or by combined means for detecting rapid rates of pressure rise and for detecting the onset of a predetermined pressure such as are described in the complete specification accompanying United States Patent application Serial No. 407,671, now Patent No. 2,768,261 dated October 23, 1956. Alternatively, or in addition, the detection means may be adapted to detect the illumination of the initial explosion flame or of the source of ignition such as are described in the complete specifications accompanying United States Patent application Serial No. 421,302.

Suppressant discharging devices 23, 23 are mounted adjacent the upper end of the two pipes 10b with their discharge outlets lying within the pipes. A further suppressant discharge device 24 is mounted with its discharge outlet lying within the pipe 12. The arrangement is such that if a fire and/or explosion is detected by any one of the four detection means, suppressant is discharged from each of the suppressant containers to prevent spread of the fire or explosion to or from the main vessel and to prevent damage to the connecting pipes. However, no attempt is made to suppress the explosion in the vessels 10, 13 and 16 but instead pressure relieving means are provided for each of the vessels 10, 13 and 16 in order to prevent the development of an excessive pressure therein.

In the case of the main vessel 10 rapid relief of any explosion is afforded by opening of the roof. Thus, the roof consists of six panels 10a, three hinged at the top of one side of the vessel 10 and the remainder hinged on the other side thereof. Each panel 10a is fixed to an arm 25 which extends outwardly from the vessel and is provided with a weight 25a at its free end. The construction is such that in the absence of any securing means the weights 25a would cause the panels 10a to pivot upwardly and outwardly to give substantial opening of the roof. However, such movement is normally prevented by struts 26 which are each pivotally secured at one end midway along the length of each arm 25, their other ends being secured to one side of the vessel 10 by an explosively operated catch 27. This catch is shown in greater detail in Figs. 4 and 5 and comprises a tie-bar 28 having a middle portion of reduced diameter which is adapted to house an explosive charge, which, as shown, is in the form of a detonator 29. The base 30 of the catch is secured to the wall of the vessel 10 and carries an upper supporting arm 31, in which one end of the tie-bar 28 is secured. The top of the tie-bar 28 also carries a terminal box 32 by which parallel electrical connections are made from each of the detectors 19 to 22 to the igniting circuit of the detonator. The lower end of the tie-bar 28 bears freely against a lower supporting member 33 and is provided with a hole 28a through which a pin 34 passes to secure the forked end of the strut 26 to the tie-bar 28.

The arrangement is such that when the explosive charge 29 is ignited, the reduced portion of the tie-bar 28 is shattered, thus releasing the lower portion so that the end of the strut 26 is free to move downwards under the action of its associated weight 25a, thereby allowing the roof panel 10a to swing open. A shield 35 is provided to stop flying fragments of the tie-bar 28.

In order to ensure that the roof panels 10a lift even if the catches 27 fail to operate, it may be arranged that some portion of the linkage fractures automatically when the pressure on the roof panels exceeds a predetermined value. Thus, for example, the arms 25 and struts 26 may be linked by a member designed to fail or release automatically at a predetermined pressure. Naturally, the pressure at which this occurs will be greater than that at which opening of the roof may occur with correct firing of the catches.

In a typical construction using a tie-bar of mild steel capable of carrying a load of one ton in tension, the load was released in approximately one millisecond from application of the igniting current.

In the case of the cyclone filter 13, the inherent strength of this is such that it can withstand a substantial rise in pressure and sufficient protection is afforded by the provision of pressure relief means (not shown) which may be of any conventional form and which need not operate with the extreme rapidity of relief means in accordance with the present invention.

In the case of the bag filter 16, rapid relief of pressure is afforded by the provision of an explosively operated bursting disc 40 on each side of the vessel. These bursting discs are preferably composed of "armour plate" glass which is obtainable, for example, from Messrs. Pilkington Bros. Such glass is so manufactured that it is internally stressed in such a manner that when the outer skin is penetrated the glass shatters into small pieces. To obtain the required rapidity of venting we propose to shatter the glass by means of an explosive charge mounted adjacent the disc. However, in certain circumstances the temperature within the vessel to be protected may be such that the heat on the outer surface of a single disc would be too great to allow safe positioning of an explosive charge close to the outer surface and the construction shown in Figs. 6 and 7 is designed to cater for such circumstances.

As shown in these figures, two armour plate glass discs 40a, 40b are positioned within a mounting ring 41 which is secured to the outside of the wall of the bag filter 16 and surrounds an aperture 16a therein. The two discs 40a, 40b are spaced apart by spacer blocks 42, which are preferably of a material of low heat conductivity and the discs 40a, 40b and blocks 42 are held in position by lugs 43 secured to the mounting ring 41. A seal is formed between the glass disc 40a and the periphery of the aperture 16a by a sealing ring 44 sandwiched therebetween. A metal striker pin 45 has its mushroom head 45a formed with a shoulder which rests on an aperture in the outer disc 40b, a suitable sealing compound being used to form a waterproof seal between the head 45a and the disc 40b. The pointed end of the striker pin 45 is located a short distance from the inner disc 40a. A detonator 46 is mounted in a holder 47 with its explosive end a short distance away from the head 45a, the holder 47 being secured to a terminal box 48 by which electrical connection is made from the explosion detectors 19 to 22 to the detonator 46. The terminal box 48 is supported from the mounting ring 41 by a bridge member 49, and carries a shield 50 for stopping flying pieces of the detonator. Ignition of the detonator 46 moves the striker pin 45 towards the inner disc 40a and effects shattering of both discs 40a, 40b, thereby affording a rapid relief of pressure through the aperture 16a.

By way of example only, it may be stated that in one typical construction the discs are 24 inches in diameter, the inner disc 40a being 3/16 of an inch thick and the outer disc 40b being 1/8 of an inch thick. The end of the detonator 45 is spaced between 1/8 and 1/16 of an inch from the head 45a of the striker pin and the point of the striker pin is spaced at a similar distance from the surface of the inner disc 40a. With this construction the discs were burst in from 2 to 3 milliseconds from application of the igniting current.

It is to be understood that where the requirement for heat insulation does not arise a single glass disc will be sufficient, the striker pin being omitted and the explosive charge being mounted adjacent the disc, preferably close to the centre thereof. The force of the explosion resulting from ignition of the charge will then shatter the disc.

Reverting now to Figs. 1 to 3, it is to be understood that the explosion detectors 19 to 22 each have their operative contacts or output circuit connected in parallel through a power supply to each of the explosive charges of the suppressant devices 23, 23, and 24, the catches 27 and the bursting discs 40 respectively. The result of this is that if an incipient explosion occurs in any one of the vessels 10, 13 or 16, or in the vicinity of the junction of the pipes 10b, 10b, all the explosive charges will be ignited, resulting in lifting of the roof of the vessel 10 and venting of the bag filter 16 through apertures 16a, thereby preventing the pressure in the vessels 10 and 16 rising above a value which the vessels can withstand. At the same time suppressant is discharged into the pipes 10b, 10b and the pipe 12 to prevent the spread of fire or explosion from one vessel to another.

The suppressant discharge devices must be capable of extremely rapid discharge, and for this purpose there may be used devices of the kind disclosed in British Patent Specification No. 643,188 or in the specification of United States Patent applications Serial No. 227,839, now Patent No. 2,712,881, dated July 12, 1955, Serial No. 377,203, now Patent No. 2,742,094, dated April 17, 1956, or Serial No. 404,574, now Patent No. 2,766,832, dated Oct. 16, 1956.

Suppressant discharging devices suitable for mounting in other than the vertical position may be required, particularly for discharging into the inclined pipes 10b. As shown in Fig. 1 such devices may comprise a pipe or manifold 23a, 24a, containing liquid suppressant and which is sealed at each end by a frangible diaphragm (not shown), one end of the manifold entering the pipe 10b or 12. The other end is united to an opening of a gas reservoir 23b, 24b, which is sealed by an explosively operated frangible diaphragm (not shown), the explosive being ignited under the control of the detectors 19 to 22. On bursting of this latter diaphragm, the released gas causes bursting of the two manifold diaphragms resulting in discharge of the suppressant into the pipe 10b or 12. Alternatively, one or both of the two latter diaphragms may be explosively burst concurrently with bursting of the first diaphragm.

Fig. 8 shows an alternative form of bursting disc using two spaced discs 60a, 60b of dished form, which may be of brittle material such as plastic, or of a ductile metal, for example silver or copper. The curvature may be greater than that shown so that the discs are hemispheres, or alternatively the discs may be plane as shown in broken lines.

The space between the discs is filled with a liquid 61, for example water. A detonator 62 or other fast exploding charge is mounted within the liquid so that on operation of the detonator the explosive pressure is transmitted through the liquid to the discs causing them to be shattered in the case of brittle material or burst in the case of ductile material.

Where the venting means is to be exposed to a high ambient temperature the detonator or explosive charge can be cooled by a continuous circulation of liquid through the space between the discs 60a, 60b. The liquid may be a fire suppressing fluid in which case it will serve to extinguish any explosive flame relieved by opening of the venting means, and in this respect the invention also broadly comprises means containing fire suppressing fluid which means when fitted to apparatus and operated to release the fluid serves to vent the apparatus to afford rapid relief of any excess pressure.

It will be appreciated that the method of effecting rapid opening of the roof shown in Figs. 1 to 3 is only one of many possible methods, and Fig. 9 shows one possible alternative method. As shown in this figure a vessel 70 has a roof 71 hinged at 71a, the roof being urged to hinge into the position shown in broken lines by a spring 72 fixed at one end to the body of the vessel 70 and at the other end to an arm 73 extending rearwardly from the roof 71. The spring 72 is normally under tension as the roof 71 is held in the closed position by an explosively operated catch 74 of the kind shown in Figs. 4 and 5, the catch being used in the inverted position relative to that in which it is shown in the earlier figures. As before, operation of the explosive charge in the catch will release the portion of the tie-bar secured to the roof 71 and allow rapid hinging of the roof 71 under the action of the spring 72 to give a rapid relief of pressure in the vessel. As a further example of the modifications possible the spring action may be replaced by a weight secured to the free end of the arm 73.

Figure 10 shows another possible form of explosively operated catch. In this construction the body of the catch comprises a chamber 80 having a lid 80a pivoted at 80b and normally held in the closed position by a coil spring 81. An explosive charge 82 is supported in a housing 83 within the chamber 80 and a terminal box 84 is provided for connection of the explosive charge 82 to the detector circuit. The lid 80a carries a projecting hooked finger 85 which is arranged to hook over any member of suitable shape, indicated diagrammatically by the broken lines 86, and which is urged by suitable means (not shown) in a direction away from the catch in order to open a relief vent or panel. In this construction firing of the explosive charge 82 forces the lid 80a upwards against the reaction of the spring 81 and moves the finger 85 clear of the member 86, thereby permitting the desired movement of the latter.

As an alternative to the use of explosively operated catches for releasing members to effect venting, an explosively operated actuator may be used which imparts a blow to a member to effect opening of a relief panel. Thus, for example, instead of the arrangement shown in Fig. 1 the roof panels 10a may be balanced so that they normally close the top of the vessel 10, the balance being upset by a blow from an actuator to effect opening of the top of the vessel. Alternatively, the actuator may be used to operate an over-centre toggle mechanism to effect panel opening.

One construction of such an actuator is shown in Fig. 11 and comprises a cylinder 90 from one end face 90a of which the end of a ram 91 projects, the other end of the ram 91 being secured to a guide member 92 formed to trap one end of a coil spring 93, the other end of which bears against the other end wall 90b of the cylinder 90. The ram 91 is joined by a connecting strap 94 to one end of a tie-bar 95 which is of similar form to that used in the catch illustrated in Figs. 4 and 5. The arrangement is such that the spring is normally held under compression.

As with the catch previously described, firing of the detonator fractures the tie-bar 95 and this frees the connecting strap 94 and ram 91 which move in the cylinder under the action of the spring, the ram being projected rapidly forwards until the guide 92 comes into contact with the end face 90a of the cylinder.

It will be understood that pressure relieving devices according to this invention may be used at low pressures where, for example, it is not possible to use conventional bursting discs as the latter would need to be too thin to be practical. Moreover, such devices avoid the difficulties normally met with in the case of bursting discs, namely that the bursting discs must be very carefully designed and manufactured if they are to operate within close tolerances of a predetermined pressure, in addition to which temperature variations affect their operating pressure. With a device according to the present invention operation is controlled solely by the detecting means. Thus the material used for the discs need not be chosen for its properties of tensile strength, as is the case with normal bursting discs, but may be chosen for other properties, for example for corrosion resistance. Also, in contrast to the conventional bursting discs any number of such venting means may be operated simultaneously under the control of a single detector, or several detectors in parallel as already described.

The methods of affording rapid relief of pressure described above are broadly applicable to the majority of explosion risks, and are also applicable to explosion risks in aircraft under certain conditions, always provided that due regard is paid to aerodynamic conditions. An example of the application of these methods of explosion protection to aircraft will now be described in connection with the explosion risks existing with aircraft fuel tanks.

Under certain circumstances it is not always possible to suppress an explosion in an aircraft fuel tank before the pressure has risen by an excessive amount. In this connection it should be borne in mind that aircraft fuel tanks may sometimes only be able to withstand a rise of pressure of the order of three pounds per square inch and that the rise in pressure due to the distribution of suppressant may itself amount to one pound per square inch so that it may not always be possible to restrict the rise in pressure to the necessary low figure.

An arrangement such as that shown in Figs. 12 and 13 may be provided in which a rubber bag tank 100 fitted in the wing 101 of an aircraft has a metal relief panel 102 clamped in a liquid-tight manner across an aperture 100a in the tank 100. An explosive cord 103, for example of the kind sold under the registered trademark "Cordtex" is supported in a loop between the panel 102 and the adjacent skin of the wing 101. Ignition of the cord 103 is effected by means of an electrically ignited match-head fuse 104 which is connected by electrical leads 105 to the incipient explosion detection means (not shown). The incipient explosion may be detected by detection means of the kind already referred to, or by means for detecting the passage of a bullet into the tank as described in the specification of United States Patent application Serial No. 349,852.

The panel 102 may be of thin metal, for example silver, copper or other readily tearable metal, or of armour plate glass or other readily frangible material. Ignition of the explosive cord 103 will shatter the panel 102 and tear a hole of corresponding size in the adjacent skin of the wing 101, thereby venting the explosion and preventing the pressure rising to a value at which explosion of the tank would completely destroy the wing.

It is also possible to provide a panel in the wing 101 similar to the panel 102 to facilitate the formation of the pressure relieving hole. When such a panel is provided in the wing it is also possible to omit the panel in the bag tank and to position the wing panel so that upon opening it allows the bag tank to stretch and blow out through the opening to prevent the pressure within the tank damaging the aircraft structure.

In a further modification a single relief panel may form part of one wall of the tank and also constitute part of the aircraft wing or fuselage.

To avoid the eruption of burning fuel from the tank, suppressant may be distributed in the tank as described in British Patent specification No. 643,188, and it may be arranged that opening of the relief panel occurs with a small time delay which gives an opportunity for suppression of the explosion to be effected before the relief panel is opened.

Apart from distributing suppressant in the fuel tank per se, it may be desirable, under certain conditions, to distribute suppressant in surrounding areas if there is a danger that in the course of relieving the pressure burning fuel may pass into the surrounding areas.

It will be appreciated by those concerned with aircraft design and construction that such relief panels can only be provided where the aerodynamic conditions permit, as otherwise the opening of a relief panel, for example in a wing of an aircraft, may have disastrous results. However, it may be possible to take certain steps with a view to reducing the sudden disturbance of the trim of the aircraft, for example by arranging that when a relief panel is opened in the aircraft structure a further relief panel is opened elsewhere in the structure to give aerodynamic compensation. Moreover, where location and aerodynamic conditions permit hinged flaps may be used for relief panels which may have a form similar to air brakes.

Fig. 14 shows an alternative construction where the bag tank 100' normally abuts the wing 101'. In this case the explosive cord 103' is virtually sandwiched between the tank 100' and wing 101' and when exploded tears an aperture in the wing 101' and bursts the tank 100' to give relief of the pressure.

What I claim is:

1. Apparatus for preventing an excessive rise in pressure in an enclosed zone having a wall forming part of the enclosure of said zone, said wall having a normally closed aperture therein, said apparatus comprising pressure sensitive means adapted to detect the onset of a predetermined pressure in said zone, and an explosive charge operable under the control of said pressure sensitive means for opening said aperture to prevent the excessive rise in pressure.

2. Apparatus for protecting plant from an excessive rise in pressure resulting from an explosion in an enclosed zone therein, comprising means for detecting an incipient explosion in said zone, said detecting means including a pair of electric contacts which are closed upon detection of an explosion, explosively operated pressure relieving means normally maintained in a non-operative condition, and an electrically ignitable explosive charge for operating said pressure relieving means, said explosive charge having an electrical ignition circuit electrically connected to said contacts, whereby said relieving means is operated upon detection of an incipient explosion by said detecting means for rendering said relieving means operative to prevent the excessive rise in pressure.

3. Apparatus according to claim 2, in which the explosion detecting means comprises photo-electric means adapted to detect the illumination of the initial explosion flame.

4. Apparatus according to claim 2, in which said explosive charge is of cable form and is arranged in a substantially closed loop adjacent a wall forming part of the enclosure of said zone, whereby ignition of said charge makes a hole in said wall to relieve the pressure in said zone.

5. Apparatus according to claim 4, in which the portion of the wall adjacent the explosive charge is of lower tensile strength than the remainder of the wall.

6. Apparatus for protecting plant from an excessive rise in pressure resulting from an explosion in an enclosed space within said plant, comprising explosion detection means including means for producing an electric output signal in response to the detection of an explosion, pressure relieving means normally maintained in a non-operative condition, an electrically ignitable explosive charge for rendering said pressure relieving means operative, and means coupling said charge to said detection means for ignition in response to production of an output signal.

7. Apparatus according to claim 6, in which the explosion detecting means is a photo-electric cell.

8. Apparatus according to claim 1, in which the aperture is normally closed by a frangible member adapted to be burst upon operation of the explosive charge.

9. Apparatus according to claim 8, in which said frangible member comprises two spaced sheets of frangible material.

10. Apparatus according to claim 6, in which the pressure relieving means comprises a panel forming part of the enclosing walls of said zone, operation of the explosive charge allowing said panel to move whereby an opening is formed in said zone.

11. Apparatus according to claim 10, comprising means urging the panel towards a position at which the opening is formed, and latching means normally preventing such movement of the panel, said latching means being released by operation of the explosive charge.

12. Apparatus according to claim 11, in which said latching means comprises a tie-bar adapted to house the explosive charge, said tie-bar being fractured upon operation of said charge.

13. Apparatus according to claim 8, in which said frangible member is of armour plate glass.

14. Apparatus according to claim 8, in which said frangible member is of plastic material.

15. Apparatus according to claim 8, in which said frangible member is of ductile metal.

16. Apparatus according to claim 10, further comprising a spring urged ram, said spring urged ram being normally held against the action of the spring by latching means, operation of the explosive charge releasing said latching means which frees said ram to move under the action of the spring to effect movement of the panel.

17. Apparatus according to claim 16, in which said latching means comprises a tie-bar secured to said ram and adapted to retain said ram in a position in which said spring is under compression, said tie-bar being fractured upon ignition of said charge.

References Cited in the file of this patent

UNITED STATES PATENTS

| 484,884 | Schock | Oct. 25, 1892 |
| 2,693,240 | Glendinning et al. | Nov. 2, 1954 |

FOREIGN PATENTS

| 643,188 | Great Britain | Sept. 15, 1950 |

OTHER REFERENCES

U. S. Bureau of Mines Bulletin R. I. 3924 "Effect of Relief Vents on Reduction of Pressures by Dust Explosions," May 1946 (pp. 13 to 20).